United States Patent
Ascough et al.

(10) Patent No.: US 11,168,905 B2
(45) Date of Patent: Nov. 9, 2021

(54) USE OF COOLING SYSTEM TO HEAT AIR SUPPLY

(71) Applicants: Tom Ascough, Dublin (IE); Sean Ascough, Blessington (IE)

(72) Inventors: Tom Ascough, Dublin (IE); Sean Ascough, Blessington (IE)

( * ) Notice: Subject to any disclaimer, the term of this patent is extended or adjusted under 35 U.S.C. 154(b) by 0 days.

(21) Appl. No.: 16/768,487

(22) PCT Filed: Nov. 29, 2018

(86) PCT No.: PCT/EP2018/082920
§ 371 (c)(1),
(2) Date: May 29, 2020

(87) PCT Pub. No.: WO2019/106059
PCT Pub. Date: Jun. 6, 2019

(65) Prior Publication Data
US 2020/0378631 A1    Dec. 3, 2020

(30) Foreign Application Priority Data
Nov. 29, 2017   (EP) ..................... 17204317

(51) Int. Cl.
*F25B 7/00*    (2006.01)
*F24F 11/00*   (2018.01)
(Continued)

(52) U.S. Cl.
CPC .......... *F24F 3/153* (2013.01); *F24F 11/0001* (2013.01); *F24F 13/222* (2013.01);
(Continued)

(58) Field of Classification Search
CPC .. F24F 3/00; F24F 3/1405; F24F 3/153; F24F 11/0001; F24F 2011/0002
See application file for complete search history.

(56) References Cited

U.S. PATENT DOCUMENTS

| 5,493,871 A |   | 2/1996 | Eiermann |
| 5,509,272 A | * | 4/1996 | Hyde ..................... F24F 3/153 |
|             |   |        | 62/176.5 |

(Continued)

FOREIGN PATENT DOCUMENTS

| EP | 2416077 A1 | 2/2012 |
| GN | 101029757 A | 9/2007 |

(Continued)

OTHER PUBLICATIONS

Korean Intellectual Property Office, Notification of Reason for Refusal Issued in Application No. 10-2020-7009206, dated Oct. 20, 2020, 14 pages.

(Continued)

*Primary Examiner* — Cassey D Bauer
*Assistant Examiner* — Daniel C Comings
(74) *Attorney, Agent, or Firm* — McCoy Russell LLP

(57) ABSTRACT

A method for conditioning air, the method comprising flowing a first air flow within a first ventilation system past a first cooling coil, which is connected to a cooling system with a cooling fluid and a cooler, characterised in that the temperature of the first air flow, when passing the first cooling coil, is lower than the temperature of the cooling fluid flowing through the first cooling coil and that the first air flow is heated and the cooling fluid flowing through the first cooling coil is cooled, when the first air flow passes through the first cooling coil.

9 Claims, 1 Drawing Sheet

(51) Int. Cl.
*F24F 3/153* (2006.01)
*F24F 13/22* (2006.01)
*F24F 110/20* (2018.01)
*F24F 110/10* (2018.01)
*F24F 3/14* (2006.01)
*F24F 8/10* (2021.01)

(52) U.S. Cl.
CPC ............... *F24F 3/1405* (2013.01); *F24F 8/10* (2021.01); *F24F 2011/0002* (2013.01); *F24F 2110/10* (2018.01); *F24F 2110/20* (2018.01); *F25B 7/00* (2013.01)

(56) References Cited

U.S. PATENT DOCUMENTS

| | | | |
|---|---|---|---|
| 6,295,823 B1 * | 10/2001 | Odom | F24F 1/0007 62/176.6 |
| 10,066,849 B2 * | 9/2018 | Lau | F24F 11/76 |
| 2013/0213608 A1 | 8/2013 | Duncan | |
| 2016/0069575 A1 * | 3/2016 | Anderson | E04H 4/129 62/77 |
| 2019/0257436 A1 * | 8/2019 | Lee | F16K 11/163 |

FOREIGN PATENT DOCUMENTS

| | | |
|---|---|---|
| GN | 101290149 A | 10/2008 |
| GN | 101849151 A | 9/2010 |
| JP | S4811851 A | 2/1973 |
| JP | H0544959 A | 2/1993 |
| JP | 2001227798 A | 8/2001 |
| JP | 2001317795 A | 11/2001 |
| JP | 2002061903 A | 2/2002 |
| JP | 2009014225 A | 1/2009 |
| JP | 2009014226 A | 1/2009 |
| JP | 2009138997 A | 6/2009 |
| JP | 2012127564 A | 7/2012 |
| JP | 2012172905 A | 9/2012 |

OTHER PUBLICATIONS

China National Intellectual Property Administration, Office Action and Search Report Issued in Application No. 201880064279.6, dated Aug. 21, 2020, 22 pages.

European Patent Office, Extended European Search Repod Issued in Application No. 17204317.6, dated May 11, 2018 Germany, 8 pages.

ISA European Patent Office, International Search Repod Issued in Application No. PCT/EP2018/082920, dated Feb. 11, 2019, WIPO, 4 pages.

Japan Patent Office, Office Action Issued in Application No. 2020-513647, dated Apr. 27, 2021, 8 pages. (Submitted with Machine Translation).

\* cited by examiner

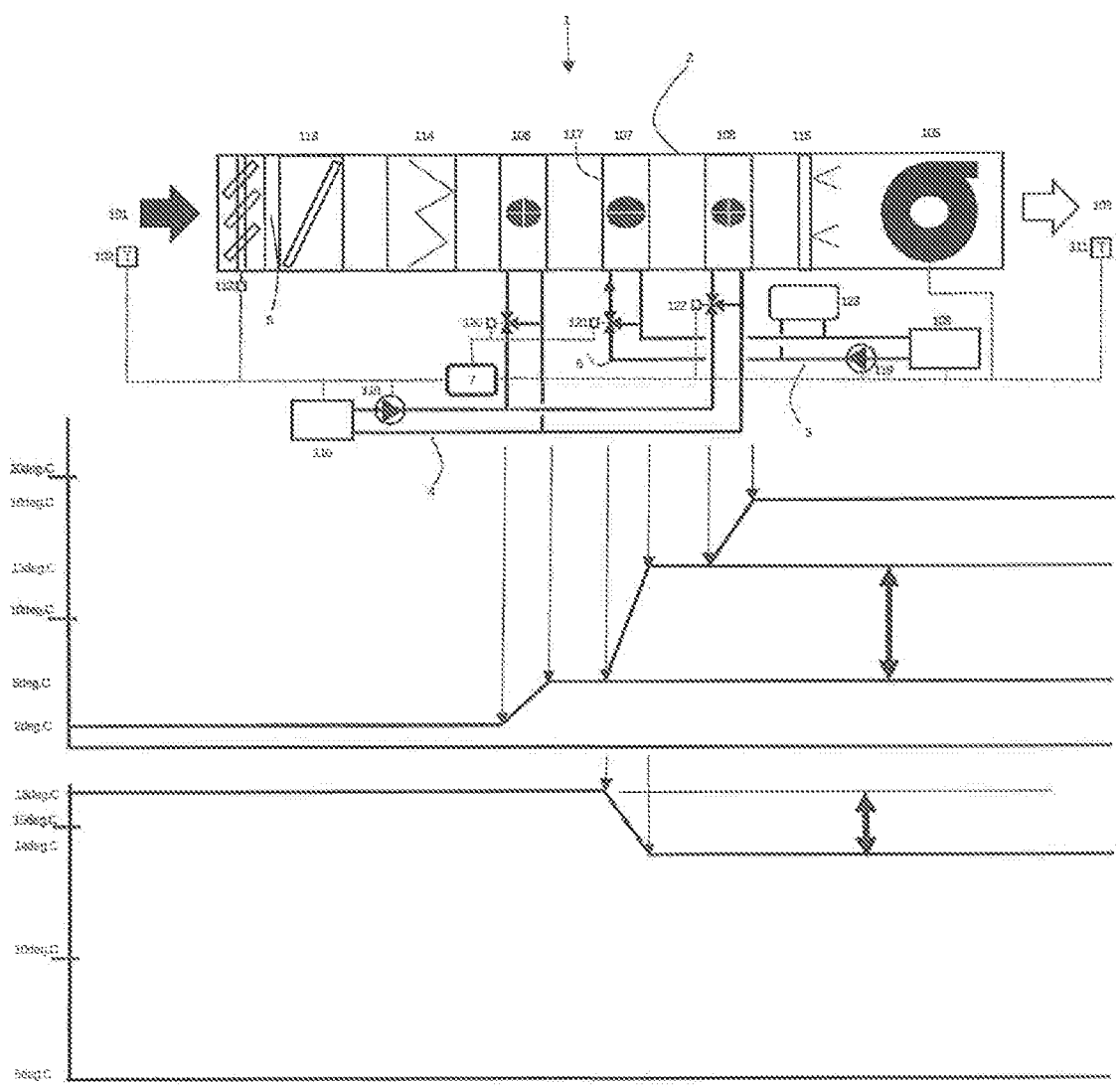

USE OF COOLING SYSTEM TO HEAT AIR SUPPLY

CROSS-REFERENCE TO RELATED APPLICATIONS

The present application is a U.S. National Phase of International Patent Application Serial No. PCT/EP2018/082920 entitled "METHOD FOR CONDITIONING AIR," filed on Nov. 29, 2018. International Patent Application Serial No. PCT/EP2018/082920 claims priority to European Patent Application No. 17204317.6 filed on Nov. 29, 2017. The entire contents of each of the above-referenced applications are hereby incorporated by reference for all purposes.

TECHNICAL FIELD

The invention relates to a method for conditioning air, the method comprises flowing a first air flow within a first ventilation system past a first cooling coil, which is connected to a cooling system with a cooling fluid and a cooler. Furthermore, it relates to a device for conducting the method according to the invention.

BACKGROUND AND SUMMARY

Conventionally, air conditioning systems, in particular air handling units (AHU) or heating, ventilation and air condition (HVAC) systems, use a cooling system including a cooler and a cooling coil to cool an air flow and a heating system including a heater and a heating coil to heat an air flow. A variety of such systems are known that are supposed to reduce the amount of energy that has to be put into heating and/or cooling.

For example, US 2013/0213608 A1 shows a device, wherein outside air is cooled and dehumidified by a cooling system. A part of the cooling fluid of the cooling system, which has a higher temperature after the process of cooling the air, is led back to a heating system. For this purpose, the cooling coil has an outlet for putting out the fluid and the heating coil has an inlet for receiving the fluid. The heating system heats the cooled/dehumidified air, before the air is given off in an indoor space. By use of the heat given off of the cooling fluid that was led back, the heating power of the heating system can be reduced, such that power can be saved.

However, all these need to be constructed in a specialised way or existing systems have to be upgraded, in order to be applicable. Thus, one problem to be solved by the present invention is to provide an easy method for saving energy in an air conditioning system. Another problem is to be able to save energy using existing systems or only having to apply minimal changes to existing systems. Furthermore, it should also be possible by the method and device of the present invention to provide an easy measure for saving energy in air conditioning systems that get newly constructed. Furthermore, preferably, less resources should be used in constructing such an air conditioning system.

This is solved by the temperature of the first air flow, when passing the cooling coil, being lower than the temperature of the cooling fluid flowing through the first cooling coil and that the first air flow is heated and the cooling fluid flowing through the cooling coil is cooled, when the first air flow passes through the first cooling coil. Furthermore, it is solved by a device comprising a control device for conducting the method according to the invention.

By this way, an air conditioning system can use the cooling system to heat air. Furthermore, the system can save energy, because the heat in the cooling system is already available and does not need to be produced. Additionally, the cooling fluid gets cooled in this process, so the temperature of the cooling fluid is lowered without the need to consume energy to cool the cooling fluid. Depending on how much the cooling fluid needs to be cooled for other applications, the cooler can run in a full power mode, in a reduced power mode, or be switched off.

Preferably, the method further comprises drawing in outside air, further preferably through an air intake damper, into the first ventilation system such that the outside air makes up the first air flow. Furthermore, one can set a temperature set point, which defines the temperature to which the outside air, or generally the air flow in the first ventilation system, should be heated. The method of the present invention is particularly applicable, when the temperature set point and the temperature of the cooling fluid flowing through the first cooling coil are higher than the temperature of the outside air. Since the temperature set point is higher than the outside temperature and since the temperature of the cooling fluid flowing through the first cooling coil is higher than the outside temperature, it is possible to heat the first air flow, using the cooling system and the cooling coil, being equivalent to the outside air being drawn in. In a preferred variant of the method, this air is then heated by a heating coil. This pre-heating of the air may be sufficient to meet the temperature supply set point of the first ventilation system, especially when the first ventilation system is supplying areas that need cooling, or a mixture of heating and cooling or different heating supply temperatures. Areas that need additional heat can either be served with top-up heat from a local second heating system and/or, a re-heating coil (where provided) in the first ventilation system can be engaged to provide top-up heat to the first air flow after it has been preheated by passing through the first cooling coil. Usually the temperature set point for preheating the air will be between 12 degrees Celsius and 19 degrees Celsius. Thus the temperature set point guarantees the comfort of people who are affected by the air conditioning system, because the heating system continues to be capable of providing any necessary top-up heat to meet the space temperature set point requirements in a preferred embodiment. This also applies to process air supply systems where the air is primarily conditioned for purposes other than human comfort. Additionally, if the outside air temperature is low, the cooling system can operate at an elevated temperature.

In a preferred variant of the method, it further comprises heating the first air flow by flowing the first air flow past a first heating coil, before flowing the first air flow past the first cooling coil, and/or further heating the first air flow by flowing the first air flow past a second heating coil, after flowing the air flow past the first cooling coil, wherein the first and the second heating coil are connected to a heating system with a heater. By this use of at least one additional heating coil, the temperature of the first air flow can be further elevated than would be possible by using the cooling system alone. The system can also only comprise one of the heating coils or make use of only one of the heating coils, or comprise more than two heating coils with a variety of possible arrangements. The system can of course also comprise more than one cooling coil, placed in different positions relative to the first cooling coil and the heating coils. Furthermore, the first heating coil can be a preheating coil and can protect the cooling coil from frost, depending on the temperature of the first air flow and in particular of the outside air being drawn in. The second heating coil can in particular be a reheat coil, such that the system can be used for dehumidifying the air, under conditions when the present invention might not be applicable, by cooling the air flow in the cooling coil, and reheating it in the reheating coil. Thus, the method is applicable to normal air conditioning systems already in use, which can be used for providing heated, cooled, humidified (where a humidifier is provided) and/or dehumidified air.

Since not only the heating coils, but also the cooling coil is used for heating in the method of the present invention, it is possible that the heater is running at a lower temperature, i.e. consuming less energy, that the flow in the heating system is lower and/or that the area of the coils is lower or the coils are smaller than would have been required without this method. Additionally, under certain conditions it may be possible to switch off the heater. Furthermore, under certain conditions, it may be possible to avoid the need for a pre-heating coil and instead use the cooling coil for pre-heating/heating.

Preferably, in the method, one uses for the cooling coil a coil that has more rows/fins than one or all of the heating coils. This allows for the use of only one cooling coil or fewer cooling coils than heating coils and for a lower temperature difference between the cooling fluid and the first air flow. Furthermore, the cooling coil preferably uses a drain tray, such that when it is used for dehumidifying the air, the drain tray collects the condensed water.

Preferably, the method further comprises using the residual heat of the cooling fluid in the cooling system to heat the first air flow. By this way one does not need to provide any additional energy to heat the first air flow, thus saving energy normally used by the air conditioning system. Preferably in such a variant, the cooler is turned off, as to not reduce the amount of residual heat available. It is clear that this method can only be used for a limited amount of time if no additional energy is brought into the cooling system, since the residual heat will be used up eventually, or the temperature difference might be too low for effective heat exchange.

In another preferred variant of the method, it further comprises a second air flow in a second ventilation system with a second cooling coil, wherein the second cooling coil is connected to the cooling system and the cooling fluid is also flowed through the second cooling system and the second cooling coil, wherein the cooling fluid is heated, while being flown through the second cooling coil. Thus, there is a heat input into the cooling system, which can again be put out at the first cooling coil, reducing the amount of heat that has to be provided by the heater. Conversely, the cooling fluid is cooled at the first cooling coil, reducing the amount of power required by the cooler in order to provide cooling via the second cooling coil. Thus, there is an energy saving both in the heater and the cooler, or in one of them.

In another preferred variant of the method, it further comprises a second cooling emitter (e.g. a chilled beam), wherein the second cooling emitter is connected to the cooling system and the cooling fluid is also flowed through the second cooling emitter, wherein the cooling fluid is heated, while being flowed through the second cooling emitter. Thus, there is a heat input into the cooling system, which can again be put out at the first cooling coil, reducing the amount of heat that has to be provided by the heater. Conversely, the cooling fluid is cooled at the first cooling coil, reducing the amount of power required by the cooler in order to provide cooling via the second cooling emitter. Thus, there is an energy saving both in the heater and the cooler, or in one of them.

Preferably, the method further comprises providing air conditioning for a facility. Even more preferred, it comprises blowing the first air flow from the first ventilation system, optionally with a supply air fan, into a first area of the facility, the second air flow is drawn into the second ventilation system from a second area of the facility, which can be overlapping with the first area, and the second air flow is blown from the second ventilation system into a third area of the facility, which can be overlapping with the first and/or the second area. Thus, the air conditioning system can provide cooling to some area of the facility, while it can also provide heating to some other area, which can also be overlapping with the area provided with cooling. These areas can also be changed according to where there is need for cooling and for heating.

It is preferable that the method further comprises measuring the outside temperature, the temperature of the first cooling fluid and/or the second cooling fluid and/or the ambient temperature in the first, second and/or third area of the facility. This makes it easier to determine the exact parameters under which the method can be applied. Furthermore it is preferable to control the flow of the first air flow, even more preferably by regulating the supply air fan and/or the air intake damper, and/or of the second air flow, the flow of the cooling fluid, even more preferably by using and regulating a valve and/or a pump in the cooling system, the flow of a heating fluid in the heating system, even more preferably by using and regulating a valve and/or a pump in the heating system, and/or the power of the cooler and/or the heater. All these measures ease reaching the right temperature of each air flow, while reducing the energy consumed, or make it possible to use smaller coils, a less powerful heater and/or cooler and/or a lower flow rate in the ventilation systems or the heating and/or cooling system.

Preferably, the method further comprises filtering the first air flow in the first ventilation system, even more preferably by using panel filters and/or bag filters. Thus, the air provided by the air conditioning system can have a higher quality. Furthermore, it is preferable that the first air flow is also humidified in the first ventilation system. Since the method of the present invention is particularly applicable when there is a low outside temperature, preferably a temperature of less than 15 degrees Celsius, even more preferably of less than 10 degrees Celsius, the most preferably of less than 7 degrees Celsius, the relative humidity of the first air flow will be reduced, when it is heated. Thus, it can provide a higher air quality and a higher comfort for people potentially affected by the air conditioning system, if the first air flow is humidified.

In another variant of the invention, it can also comprise dehumidifying the first air flow.

Preferably, some or all of the preferred measures mentioned above for the first ventilation system are also applied to the second ventilation system.

Furthermore the invention comprises a device for conditioning air, comprising a first ventilation system with a first air flow, preferably connected with the outside, the connection even more preferably comprising an air intake damper, a first cooling coil, preferably comprising a drain tray, in the first ventilation system, connected to a cooling system with a cooler, preferably further comprising a valve and/or a pump in the cooling system, a heating system with a heater and a first and a second heating coil arranged in the first ventilation system, wherein even more preferably the first and the second heating coil have less rows and/or fins than the cooling coil and/or the heating system comprises a valve and/or a pump, a second ventilation system with a second air flow and/or a second cooling emitter, within which a second cooling coil/emitter is arranged that is connected to the same cooling system as connected to the first ventilation system, wherein a control device is provided for conducting a method as described above.

BRIEF DESCRIPTION OF THE FIGURES

FIG. 1 is schematic diagram of an example of an air conditioning system.

Hereafter, the invention will be described more closely on the basis of a preferred embodiment depicted in the drawing FIG. 1. However, the invention shall not be considered limited to this preferred embodiment.

DETAILED DESCRIPTION

In particular, FIG. 1 shows an air conditioning system 1 with a first ventilation system 2, a cooling system 3 and a heating system 4. The first ventilation system 2 comprises an air intake damper 112, through which outside air 101, e.g. 2 degrees Celsius, is drawn into the first ventilation system 2, wherein the outside air 101 has a temperature 102. The drawn in outside air 101 makes up the first air flow 5. Consequently, the first air flow 5 within the first ventilation system 2 is filtered through a panel filter 113 and a bag filter 114.

Next, the first air flow 5 passes a first heating coil 106, which can also be termed as a preheating coil, where the first air flow 5 is heated from the outside air temperature 102, e.g. 2 degrees Celsius, to a higher temperature, e.g. 5 degrees Celsius. If the outside air temperature 102 is below freezing temperature, in particular below freezing temperature of a cooling fluid 6, then the temperature of the first air flow 5 should at least be elevated above the freezing temperature by the first heating coil 106.

Thereupon, the first air flow 5 passes the first cooling coil 107. The temperature of the first air flow 5 immediately before the first cooling coil 107 is lower than the temperature of the cooling fluid 6 flowing through the first cooling coil 107. Thus the first air flow 5 is heated upon passing the first cooling coil 107, while the cooling fluid 6 is cooled. The elevated temperature of the first air flow 5 after passing the cooling coil can for instance be 13 degrees of Celsius. Meanwhile, the temperature of the cooling fluid 6 immediately before flowing through the first cooling coil 107 can be 16 degrees Celsius, which corresponds to an elevated temperature, as normally possible for seasonally cooler periods of the year. After passing the first cooling coil 107, the temperature of the cooling fluid can for example be 14 degrees Celsius. Thus, the cooling fluid 6 has received "free" cooling, while the first air flow 5 has received "free" heating, where "free" means that no additional energy has been consumed in a heater or a cooler.

Ensuingly, the first air flow 5 passes the second heating coil 108, wherein the temperature of the first air flow 5 is further elevated to a final temperature 111, which can e.g. be 18 degrees Celsius. The second heating coil 108 can also be termed a reheat coil, since under conditions to which this invention may not be applicable, it might be used for reheating the first air flow 5, after it had been cooled and thus dehumidified in the first cooling coil 107. Next the first air flow 5 passes a humidifier 115, which can provide extra humidification in case this is required.

Lastly, the first air flow 5 is blown into a first area 103 of a facility at a final temperature 111 by a supply air fan 105.

The first cooling coil 107 is connected to the cooling system 3 containing the cooling fluid 6. The cooling system further comprises a pump 119, cooling control valve 121 and a cooler 109. The cooling system can further comprise a second cooling coil, connected to a second ventilation system (not depicted in FIG. 1) and/or second cooling emitter 123 (e.g. a chilled beam or fan coil). Depending on the conditions of the second ventilation system, the cooler 109 can be running in a full power mode, a reduced power mode or be switched off.

The first and the second heating coil are connected to the heating system 4, which further comprises a heater 110, pre-heating control valve 120, re-heating control valve 122 and pump 118. Exemplary, by use of the method of the current invention, the heating system 4 only has to heat the first air flow 5 from 2 to 5 degrees of Celsius and from 13 to 18 degrees of Celsius, while without the use of the method of the present invention it would have to heat the first air flow 5 from 2 to 18 degrees of Celsius.

A control device 7 is provided for controlling some or all of the HVAC system components. By means of the control device 7 especially cooling system pump 119 is activated in case the temperature of the first air flow 5 immediately before the first cooling coil 107 is lower than the temperature of the cooling fluid 6 flowing through the first cooling coil 107.

The two charts below the schematic depiction of the air conditioning system are a temperature chart for the first air flow 5 on the top and a temperature chart for the cooling fluid 6 on the bottom. The double pointed arrow in the first air flow temperature chart illustrates an example of the heating energy that can be saved by implementing the present invention. The double pointed arrow in the cooling fluid temperature chart depicts an example of the cooling that is achievable without additional energy expediture from the cooler 109 by implementing the present invention. The values in the temperature chart follow the exemplary values mentioned above.

The preferred embodiment depicted in the FIGURE and described herein shall only serve to explain the invention and shall in no way limit the invention to this embodiment.

The invention claimed is:

1. A method for conditioning air, the method comprising flowing a first air flow within a first ventilation system with a first air intake, a first output or air supply, and a first cooling coil therebetween, flowing the first air flow past the first cooling coil, which is connected to a cooling system with a cooling fluid and a cooler capable of cooling the cooling fluid and delivering the cooled cooling fluid to the cooling coil, wherein a temperature of the first air flow, when passing the first cooling coil, is lower than a temperature of the cooling fluid flowing through the first cooling coil and wherein the first air flow is heated and the cooling fluid flowing through the first cooling coil is cooled, when the first air flow passes through the first cooling coil, wherein residual heat of the cooling fluid in the cooling system is used to heat the first air flow, and the method further comprises heating the first air flow, before flowing the first air flow past the first cooling coil, and the method further comprises cooling a second cooling emitter that is not located within the first ventilation system, wherein the second cooling emitter is connected to the cooling system and the cooling fluid is also flowed through the second cooling emitter, wherein the cooling fluid is heated, while being flowed through the second cooling emitter, and the method further comprises turning the cooler off or reducing its output to not reduce the residual heat.

2. The method according to claim 1, wherein the method comprises drawing in outside air at a temperature, through an air intake damper, into the first ventilation system such that the outside air makes up the first air flow, and prescribing a temperature set point for the first ventilation system, wherein the temperature set point and the temperature of the cooling fluid flowing through the first cooling coil are higher than the temperature of the outside air.

3. The method according to claim 1, wherein the method further comprises further heating the first air flow by flowing the first air flow past a second heating coil, after flowing the first air flow past the first cooling coil, wherein the second heating coil is connected to the heating system with the heater.

4. The method according to claim 3, characterized by using a coil with a drain tray as the first cooling coil.

5. The method according to claim 1, wherein the method further comprises cooling a second air flow in a second ventilation system with a second air intake, a second output or air supply, and a second cooling coil therebetween, wherein the second cooling coil is connected to the cooling system and the cooling fluid is also flowed through the second cooling coil, wherein the cooling fluid is heated while flowing through the second cooling coil.

6. The method according to claim 5, wherein the method comprises providing air conditioning for a facility and blowing the first air flow from the first ventilation system, with a supply air fan, into a first area of the facility, wherein the second air flow is drawn into the second ventilation system from a second area of the facility, which can be overlapping with the first area, and the second air flow is blown from the second ventilation system into a third area of the facility, which can be overlapping with the first and/or the second area.

7. The method according to claim 6, wherein the method further comprises:
    measuring an outside air temperature, the temperature of a first cooling fluid and/or a second cooling fluid and/or an ambient temperature in the first, second and/or third area of the facility,
    controlling a flow of the first air flow and/or of the second air flow, by regulating the supply air fan and/or an air intake damper,
    controlling the flow of the cooling fluid, by using and regulating a valve and/or a pump in the cooling system,
    controlling the flow of a heating fluid in the heating system, by using and regulating a valve and/or a pump in the heating system, and
    controlling the power of the cooler and/or the heater.

8. The method according to claim 1, wherein the method further comprises filtering the first air flow in the first ventilation system, by panel filters and/or bag filters, and humidifying the first air flow in the first ventilation system with a humidifier.

9. A device for conditioning air, comprising a first ventilation system with a first air flow, connected with the outside, the connection comprising an air intake damper, a first cooling coil in the first ventilation system, connected to a cooling system with a cooler, a second ventilation system with an air intake, an output or air supply, and a second cooling coil therebetween, the second ventilation system with a second air flow, within which a second cooling coil is arranged that is connected to the cooling system, and the first ventilation system further comprising a first heating coil, which is connected to a heating system with a heater, wherein the cooling system further comprises a controller configured to conduct the method according to claim 1.

* * * * *